United States Patent
Huang

(10) Patent No.: US 9,268,077 B2
(45) Date of Patent: Feb. 23, 2016

(54) PROJECTION DEVICE

(71) Applicant: DELTA ELECTRONICS, INC., Taoyuan Hsien (TW)

(72) Inventor: June-Jei Huang, Taoyuan Hsien (TW)

(73) Assignee: DELTA ELECTRONICS, INC. (TW)

( * ) Notice: Subject to any disclaimer, the term of this patent is extended or adjusted under 35 U.S.C. 154(b) by 137 days.

(21) Appl. No.: 14/273,944

(22) Filed: May 9, 2014

(65) Prior Publication Data

US 2015/0271479 A1 Sep. 24, 2015

(30) Foreign Application Priority Data

Mar. 24, 2014 (TW) ............................. 103110799 A

(51) Int. Cl.
*G03B 21/28* (2006.01)
*H04N 9/14* (2006.01)
(Continued)

(52) U.S. Cl.
CPC ................ *G02B 6/00* (2013.01); *G03B 21/008* (2013.01); *G03B 21/2066* (2013.01); *G03B 21/2073* (2013.01); *G03B 21/28* (2013.01); *H04N 9/14* (2013.01); *H04N 9/3108* (2013.01); *H04N 9/3129* (2013.01); *H04N 9/3167* (2013.01); *H04N 13/0402* (2013.01);
(Continued)

(58) Field of Classification Search
CPC ............ G03B 21/008; G03B 21/2066; G03B 21/0273; G03B 21/208; H04N 13/0402; H04N 13/0427; H04N 13/0429; H04N 13/0434; H04N 13/0438; H04N 9/14; H04N 9/31; H04N 9/3108; H04N 9/3129; H04N 9/3167

USPC ............ 353/8, 20, 31, 33, 34, 37, 98; 362/42, 362/44, 55, 57; 348/742, 743, 771; 349/5, 349/7, 8, 9; 359/462, 465, 464
See application file for complete search history.

(56) References Cited

U.S. PATENT DOCUMENTS 5,450,219 A * 9/1995 Gold .................... H04N 9/3117
                                                                 348/E9.027
5,700,076 A * 12/1997 Minich ............... G02B 27/0927
                                                                 348/771

(Continued)

OTHER PUBLICATIONS

T. Kanebako and Y. Takaki, "Time-multiplexing display module for high-density directional display," in Stereoscopic Displays and Applications XIX, A. Woods, N. Holliman, and J. Merritt, eds., Proc. IE-IS&T Electronic Imaging 6803, 68030P (2008).

(Continued)

*Primary Examiner* — William C Dowling
(74) *Attorney, Agent, or Firm* — Hauptman Ham, LLP

(57) ABSTRACT

A projection device includes a light source, a galvano-mirror, a polarizing selector, an optical module, a light modulator, a lens, and a prism group. The light source is configured to provide a light beam. The galvano-mirror is configured to deflect the light beam to different directions in sequence. The polarizing selector is configured to selectively convert the polarization state of the light beam. The optical module has an entrance and an exit. The light beam passing through the polarizing selector enters the optical module from the entrance, and the optical module guides the light beam to the exit. The optical module includes a polarization beam splitter, a reflector, a first wavelength retarder, a right-angled triangular prism, and a second wavelength retarder. The polarization beam splitter guides the light beam that entering the entrance to different optical paths according to the polarization state of the light beam.

10 Claims, 8 Drawing Sheets

(51) Int. Cl.
    *H04N 9/31*     (2006.01)
    *G02B 6/00*     (2006.01)
    *G03B 21/20*     (2006.01)
    *H04N 13/04*     (2006.01)
    *G03B 21/00*     (2006.01)

(52) U.S. Cl.
    CPC ...... *H04N 13/0429* (2013.01); *H04N 13/0434* (2013.01); *H04N 13/0438* (2013.01)

(56) References Cited

U.S. PATENT DOCUMENTS

| | | | |
|---|---|---|---|
| 6,896,371 B2 * | 5/2005 | Shimizu | G02B 27/283 348/E5.141 |
| 7,894,419 B2 | 2/2011 | Turpin et al. | |
| 7,944,465 B2 | 5/2011 | Goulanian et al. | |
| 8,004,761 B2 | 8/2011 | Chien et al. | |
| 8,113,660 B1 * | 2/2012 | Troyer | G03B 21/00 353/31 |
| 9,182,609 B2 * | 11/2015 | Aboshi | G02B 27/48 1/1 |
| 2005/0213182 A1 | 9/2005 | Cossairt et al. | |
| 2015/0131058 A1 * | 5/2015 | Huang | G02B 27/2214 353/7 |

OTHER PUBLICATIONS

Takahiro Ishinabe, Tohru Kawakami and Tatsuo Uchida, "High-Resolution Floating Autostereoscopic 3D Display Based on Iris-Plane-Dividing Technology", SID Int. Symp. Digest Tech. Papers 17.5, pp. 225-228 (2012).

* cited by examiner

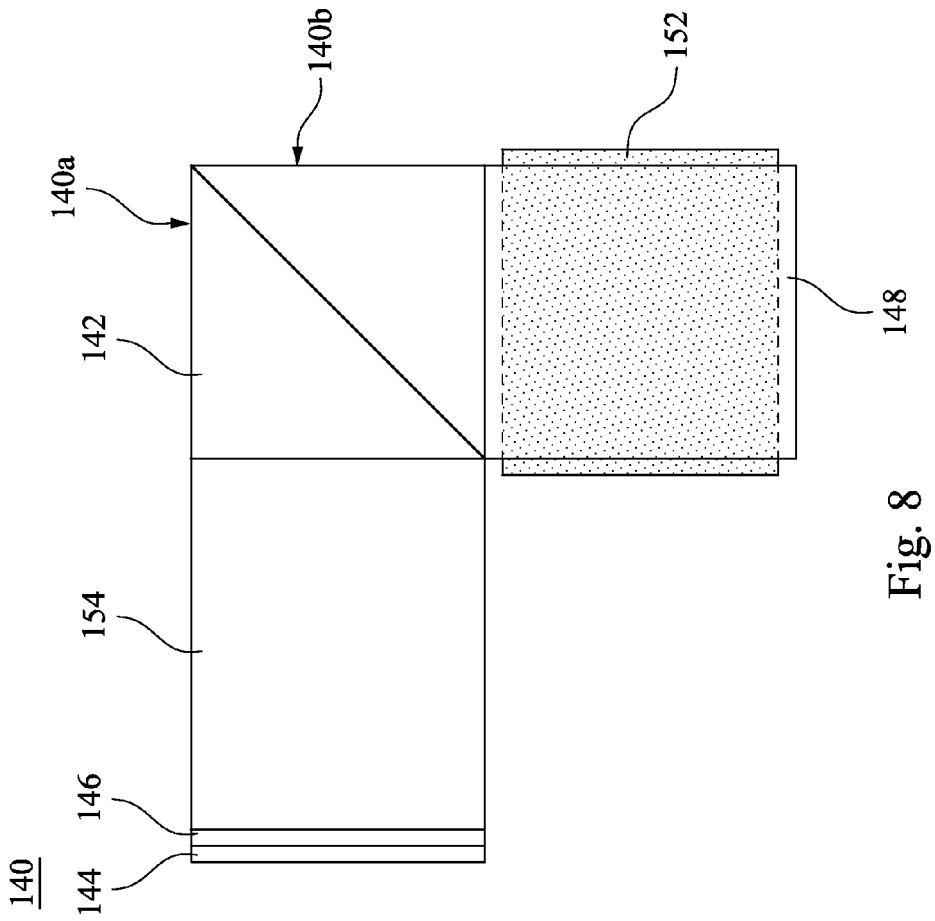
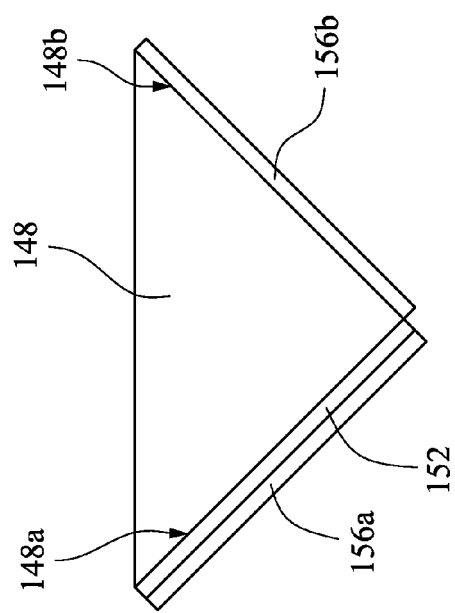
Fig. 8
Fig. 7

PROJECTION DEVICE

RELATED APPLICATIONS

This application claims priority to Taiwan Application Serial Number 103110799, filed Mar. 24, 2014, which is herein incorporated by reference.

BACKGROUND

1. Field of Invention

The present invention relates to a projection device.

2. Description of Related Art

Exploiting the binocular parallax of humans, a stereoscopic display enables an observer to experience a stereoscopic image by providing two different images respectively to two eyes of the observer. An autostereoscopic display, unlike other kinds of stereoscopic displays which require special glasses to distinguish left-eye and right-eye images, provides a plurality of images from a plurality of light sources, in which the respective images are projected to different spatial positions. Two eyes of an observer can receive different images corresponding to any two of the spatial positions respectively so that the observer perceives a stereoscopic image. Autostereoscopic display technology avoids the inconvenience of wearing glasses necessary in stereoscopic display technology, and has become an area of the most interested developments in recent times.

SUMMARY

An aspect of the present invention is to provide a projection device including a light source, a galvano-mirror, a polarizing selector, an optical module, a light modulator, a lens, and a prism group. The light source is configured to provide a light beam. The galvano-mirror is configured to deflect the light beam to different directions in sequence. The polarizing selector is configured to selectively convert the polarization state of the light beam. The optical module has an entrance and an exit. The light beam passing through the polarizing selector enters the optical module from the entrance, and the optical module guides the light beam to the exit. The optical module includes a polarization beam splitter, a reflector, a first wavelength retarder, a right-angled triangular prism, and a second wavelength retarder. The polarization beam splitter has the entrance and the exit. The polarization beam splitter guides the light beam that entering the entrance to different optical paths according to the polarization state of the light beam. The first wavelength retarder is disposed between the polarization beam splitter and the reflector. The right-angled triangular prism has a hypotenuse surface and two leg surfaces opposite to each other. The hypotenuse surface of the right-angled triangular prism is disposed facing the polarization beam splitter. The second wavelength retarder is disposed on one of the leg surfaces of the right-angled triangular prism. The light modulator is configured to modulate the light beam passing through the exit of the optical module into a plurality of images in sequence. The prism group is configured to guide the light beam passing through the exit of the optical module to the light modulator, and guide the images to the lens.

In one or more embodiments, the reflector is disposed at one side of the polarization beam splitter opposite to the entrance, and the right-angled triangular prism is disposed at one side of the polarization beam splitter opposite to the exit.

In one or more embodiments, the reflector is disposed at one side of the polarization beam splitter opposite to the exit, and the right-angled triangular prism is disposed at one side of the polarization beam splitter opposite to the entrance.

In one or more embodiments, the leg surfaces of the right-angled triangular prism are both totally internal reflection surfaces.

In one or more embodiments, the optical module further includes two reflective layers respectively disposed on the leg surfaces of the right-angled triangular prism.

In one or more embodiments, the polarization beam splitter is a polarization beam splitting prism.

In one or more embodiments, the optical module further includes a prism disposed between the polarization beam splitter and the first wavelength retarder.

In one or more embodiments, the polarizing selector is a liquid crystal panel. When the liquid crystal panel is in on-state, the liquid crystal panel allows converting the polarization state of the light beam, and when the liquid crystal panel is in off-state, the light beam maintains the polarization state when passing through the liquid crystal panel.

In one or more embodiments, a rotational direction of the galvano-mirror in a first time period is opposite to a rotational direction of the galvano-mirror in a second time period.

In one or more embodiments, periods of the images modulated by the light modulator during the first time period are the same as periods of the images modulated by the light modulator during the second time period.

BRIEF DESCRIPTION OF THE DRAWINGS

FIG. 7 is a side view of a right-angled triangular prism, a second wavelength retarder, and reflective layers according to another embodiment of the present invention;

FIG. 8 is a side view of an optical module according to another embodiment of the present invention.

DETAILED DESCRIPTION

Figure 1:
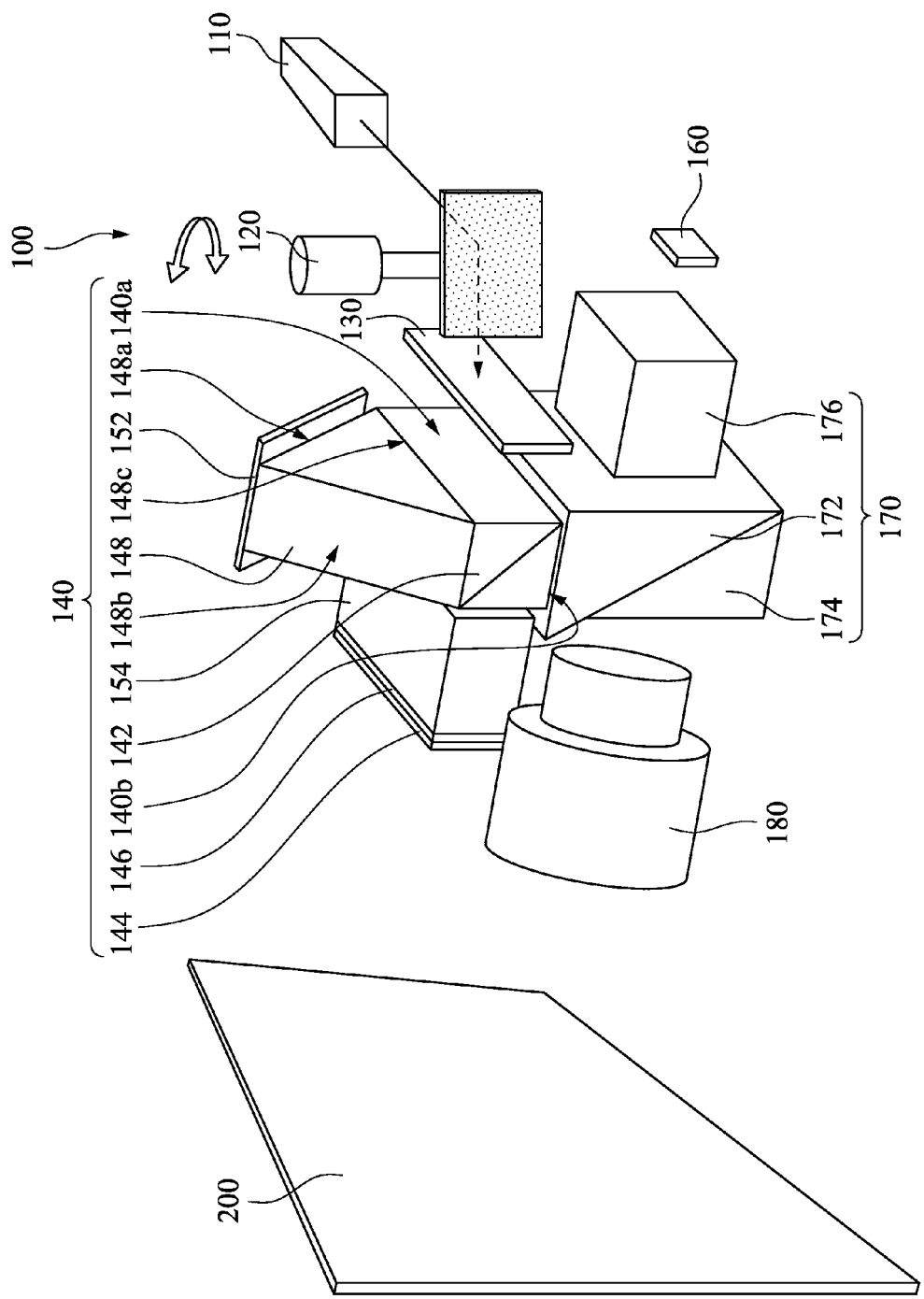
FIG. 1 is a perspective view of a projection device according to one embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a perspective view of a projection device 100 according to one embodiment of the present invention. The projection device 100 includes a light source 110, a galvano-mirror 120, a polarizing selector 130, an optical module 140, a light modulator 160, a prism group 170, and a lens 180. The light source 110 is configured to provide a light beam. The galvano-mirror 120 is configured to deflect the light beam to different directions in sequence. The polarizing selector 130 is configured to selectively convert the polarization state of the light beam. The optical module 140 has an entrance 140a and an exit 140b. The light beam passing through the polarizing selector 130 enters the optical module 140 from the entrance 140a, and the optical module 140 guides the light beam to the exit 140b. The optical module 140 includes a polarization beam splitter 142, a reflector 144, a first wavelength retarder 146, a right-angled triangular prism 148, and a second wavelength retarder 152. The polarization beam splitter 142 has the entrance 140a and the exit 140b. The polarization beam splitter 142 guides the light beam that entering the entrance 140a to one of two optical paths according to the polarization state of the light beam, which is described in the following paragraphs. The first wavelength retarder 146 is disposed between the polarization beam splitter 142 and the reflector 144. The right-angled triangular prism 148 has a hypotenuse surface 148c and two leg surfaces 148a, 148b opposite to each other. The hypotenuse surface 148c of the right-angled triangular prism 148 is disposed facing the polarization beam splitter 142. The second wavelength retarder 152 is disposed on the leg surface 148a of the right-angled triangular prism 148. The light modulator 160 is configured to modulate the light beam passing through the exit 140b of the optical module 140 into a plurality of images in sequence. The prism group 170 is configured to guide the light beam passing through the exit 140b of the optical module 140 to the light modulator 160, and guide the images to the lens 180.

Figure 2:
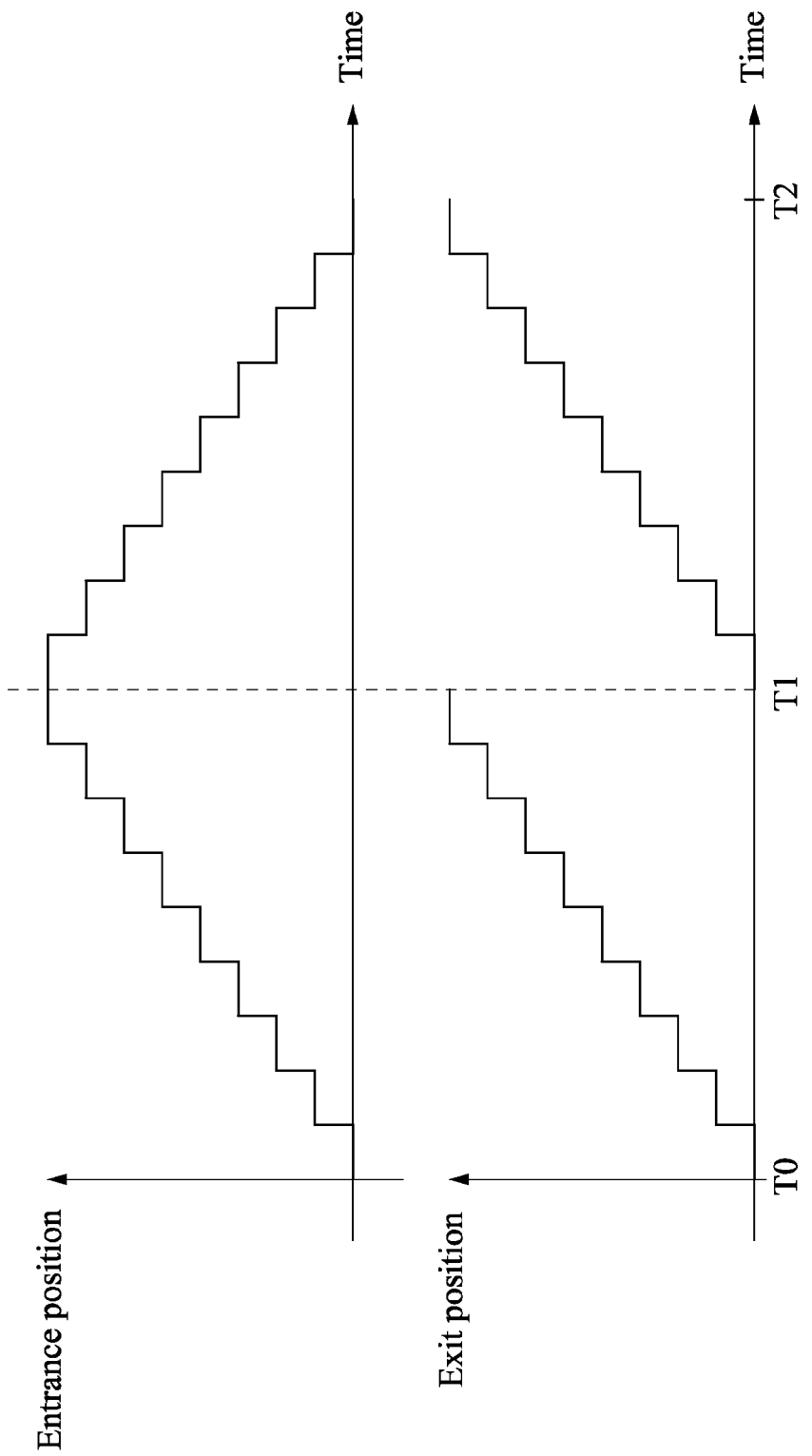
FIG. 2 is a graph of positions of an optical axis of a light beam of FIG. 1 on an entrance and on an exit of an optical module.

FIG. 2 is a graph of positions of an optical axis of the light beam of FIG. 1 on the entrance 140a and on the exit 140b of the optical module 140. Reference is made to FIGS. 1 and 2. More specifically, during a first time period (i.e., from time T0 to time T1), the galvano-mirror 120 rotates along a rotational direction, such that the optical axis of the position of the light beam impinging on the entrance 140a shifts (toward the positive direction in FIG. 2) with time. The polarization state of the light beam is converted after the light beam passes through the polarizing selector 130. The light beam then passes through the optical module 140 and emerges from the exit 140b. The optical axis of the position of the light beam impinging on the exit 140b shifts (toward the positive direction in FIG. 2) with time. During a second time period (i.e., from time T1 to time T2), the galvano-mirror 120 rotates along another rotational direction, where the rotational direction of the galvano-mirror 120 in the first time period is opposite to that of the galvano-mirror 120 in the second time period. The light beam maintains the polarization state after passing through the polarizing selector 130. The optical axis of the position of the light beam impinging on the entrance 140a of the optical module 140 shifts (toward the negative direction in FIG. 2) with time. The light beam then passes through the optical module 140 and emerges from the exit 140b. The optical axis of the position of the light beam impinging on the exit 140b shifts (toward the positive direction in FIG. 2) with time.

If the rotational direction of the galvano-mirror 120 in the first time period is opposite to the that of the galvano-mirror 120 in the second time period, and the light beam does not pass through the polarizing selector 130 and the optical module 140, the frame rates of the images with different views generated by the projection device 100 are different from each other. The frame repetition time of the middle view, for example, the view of the image generated in the time (T0+T1)/2, is short, and the frame repetition time gets longer as the view toward to two terminals, for example, the view of the image generated in the time T1. In this embodiment, however, even thought the rotational direction of the galvano-mirror 120 in the first time period is opposite to that of the galvano-mirror 120 in the second time period, which causes the shift directions of the light beam on the entrance 140a of the optical module 140 in the first and the second time periods are opposite to each other, the shift directions of the light beam on the exit 140b of the optical module 140 in the first and the second time periods are the same. Hence, the projection device 100 can generate the images with the greatest frame rates that are the same as that of the middle view.

Figure 3:
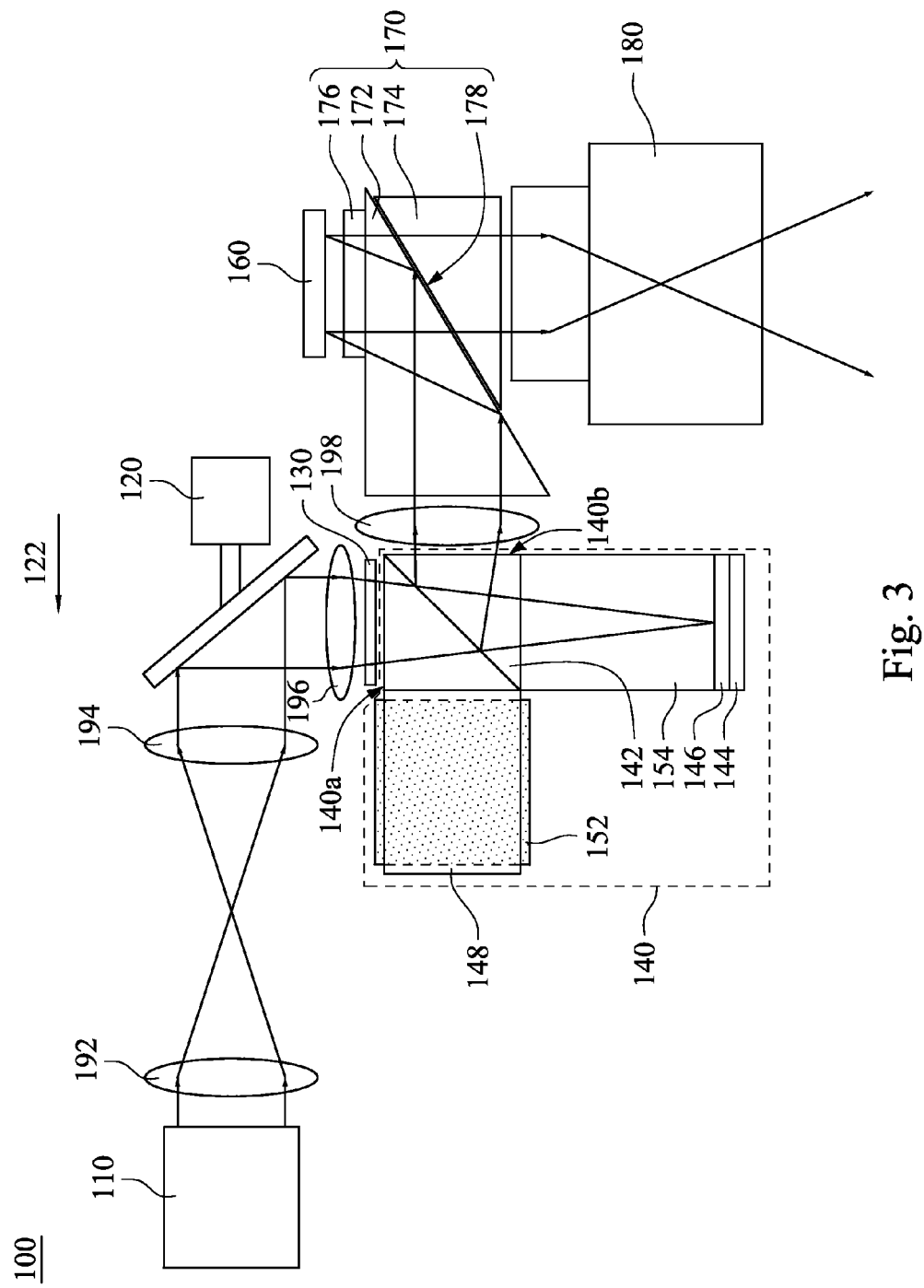
FIG. 3 is an optical schematic diagram of the projection device of FIG. 1 in the first time period.

In greater detail, reference is made to FIG. 3 which is an optical schematic diagram of the projection device 100 of FIG. 1 in the first time period. For the sake of clarity, the FIG. 3 is drawn in a plane view form. An area from the light source 110 to the galvano-mirror 120 is shown along a top view direction of FIG. 1, and an area from the galvano-mirror 120 to the lens 180 is shown along a side view direction of FIG. 1. In this embodiment, the light source 110 can be a laser for providing a light beam with p-polarized state, and the claimed scope is not limited with this respect. The polarizing selector 130 can be a liquid crystal panel. When the liquid crystal panel is in on-state, which is defined as the first time period, the liquid crystal panel allows to convert the polarization state of the light beam, and when the liquid crystal panel is in off-state, which is defined as the second time period, the light beam maintains the polarization state when passing through the liquid crystal panel. Moreover, the projection device 100 can further include a plurality of lenses 192, 194, and 196. The lenses 192 and 194 are disposed between the light source 110 and the galvano-mirror 120, and the lens 196 is disposed between the galvano-mirror 120 and the polarizing selector 130. Hence, in the first time period, the light source 110 emits the light beam with p-polarized state. The light beam passes through the lenses 192 and 194 and impinges on the galvano-mirror 120. The galvano-mirror 120 rotates along an axis 122, such that the light beam is reflected to different directions in sequence by the galvano-mirror 120. The light beam then passes through the lens 196 and the polarizing selector 130, and is converted into the s-polarized state light beam by the polarizing selector 130 in sequence.

Figure 4:
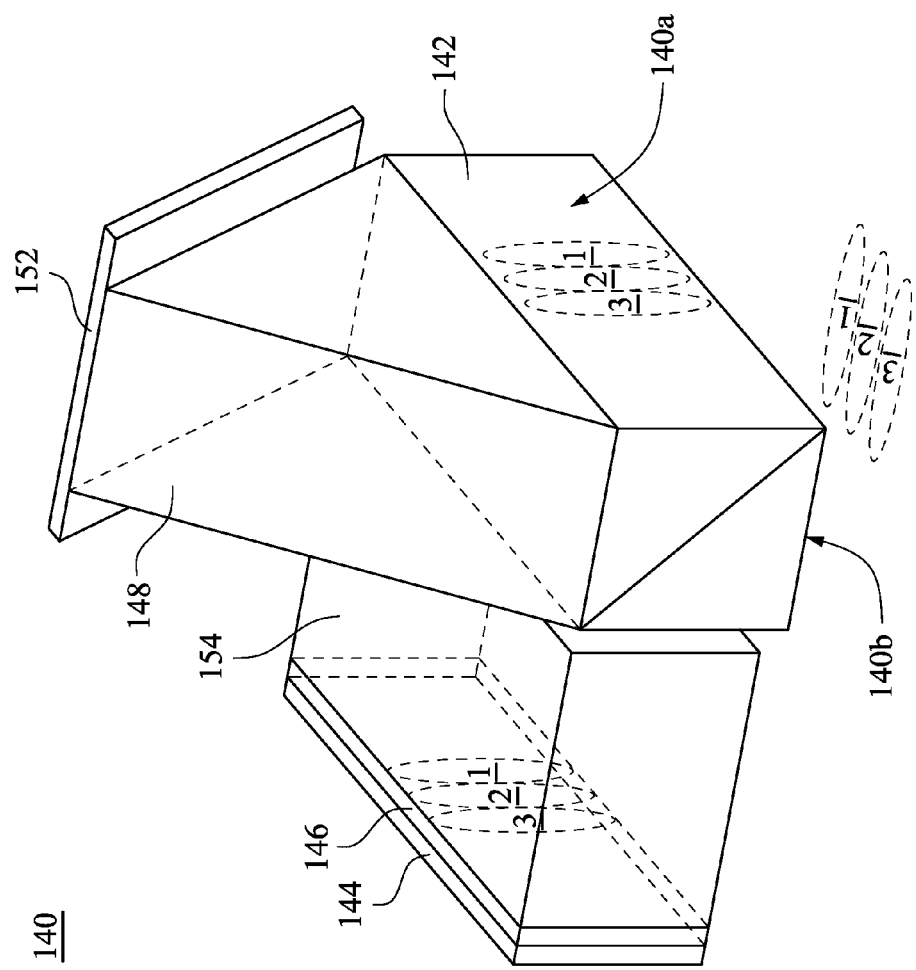
FIG. 4 is an optical schematic diagram of the optical module of FIG. 1 in the first time period.

FIG. 4 is an optical schematic diagram of the optical module 140 of FIG. 1 in the first time period. Reference is made to FIGS. 3 and 4. In this embodiment, the reflector 144 of the optical module 140 is disposed at one side of the polarization beam splitter 142 opposite to the entrance 140a, and the right-angled triangular prism 148 is disposed at one side of the polarization beam splitter 142 opposite to the exit 140b. Both of the first wavelength retarder 146 and the second wavelength retarder 152 are quarter-wave plates. The leg surfaces 148a and 148b (see FIG. 1) of the right-angled triangular prism 148 are both totally internal reflection surfaces. The polarization beam splitter 142 can be a polarization beam splitting prism. The polarization beam splitter 142, for example, allows the light beam with s-polarized state to pass therethrough, and reflects the light beam with p-polarized state. In one or more embodiments, the optical module 140 can further include a prism 154 disposed between the polarization beam splitter 142 and the first wavelength retarder 146.

In the first time period, the light beams with s-polarized state impinge on the entrance 140a in sequence. In FIG. 4, the light beams with different sequence indicated by the optical axes 1, 2, and 3 thereof, and the order of the marker represents time sequence. In other words, a time interval of the light beam with the optical axis 1 is earlier than a time interval of the light beam with the optical axis 2, and the time interval of the light beam with the optical axis 2 is earlier than a time interval of the light beam with the optical axis 3. Accordingly, the light beam shifts along an out-of-plane direction, which corresponds to the positive direction of FIG. 2. It is noted that although there are three optical axes in FIG. 4, that is, in the first time period, the galvano-mirror 120 deflects the light beam to three different directions in sequence, the claimed scope is not limited in this respect. A person having ordinary skill in the art may select suitable number of deflection directions according to real requirements.

The light beam with s-polarized state enters the polarization beam splitter 142 from the entrance 140a, and passes through the polarization beam splitter 142. After sequentially passing through the prism 154 and the first wavelength retarder 146, the light beam is reflected by the reflector 144, and thus once more passes through the first wavelength retarder 146. Since the light beam passes through the first wavelength retarder 146 twice, the light beam with s-polarized state is converted into the light beam with p-polarized state. Subsequently, the light beam passes through the prism 154 and propagates back to the polarization beam splitter 142. The polarization beam splitter 142 reflects the light beam to the exit 140b, and the light beam emerges from the exit 140b and shifts toward the out-of-plane direction.

Reference is made again to FIG. 3. The projection device 100 can further include a lens 198 disposed between the optical module 140 and the prism group 170. The prism group 170 includes prisms 172, 174, and 176. A totally internal reflection interface 178 is formed between the prisms 172 and 174. A light beam can be reflected by the totally internal reflection interface 178 if it is incident the totally internal reflection interface 178 at an angle greater than the totally internal reflection angle thereof, and can pass therethrough if it is incident the totally internal reflection interface 178 at an angle smaller than the totally internal reflection angle thereof.

The light beam leaving the optical module 140 then passes through the lens 198, enters the prism 172, and is incident the totally internal reflection interface 178 at an angle greater than the totally internal reflection angle. Hence, the light beam is reflected to the prism 176 by the totally internal reflection interface 178 and reaches the light modulator 160. The light modulator 160 modulates the light beam into a plurality of images in sequence, where the light beams with the optical axes 1, 2, and 3 of FIG. 4 are modulated into different images. These images are reflected back to the prism group 170 in sequence, pass through the prisms 176 and 172, and are incident the totally internal reflection interface 178 at an angle smaller than the totally internal reflection angle. Hence, the images pass through the totally internal reflection interface 178, pass through the prism 174, and impinge on the lens 180.

Figure 5:
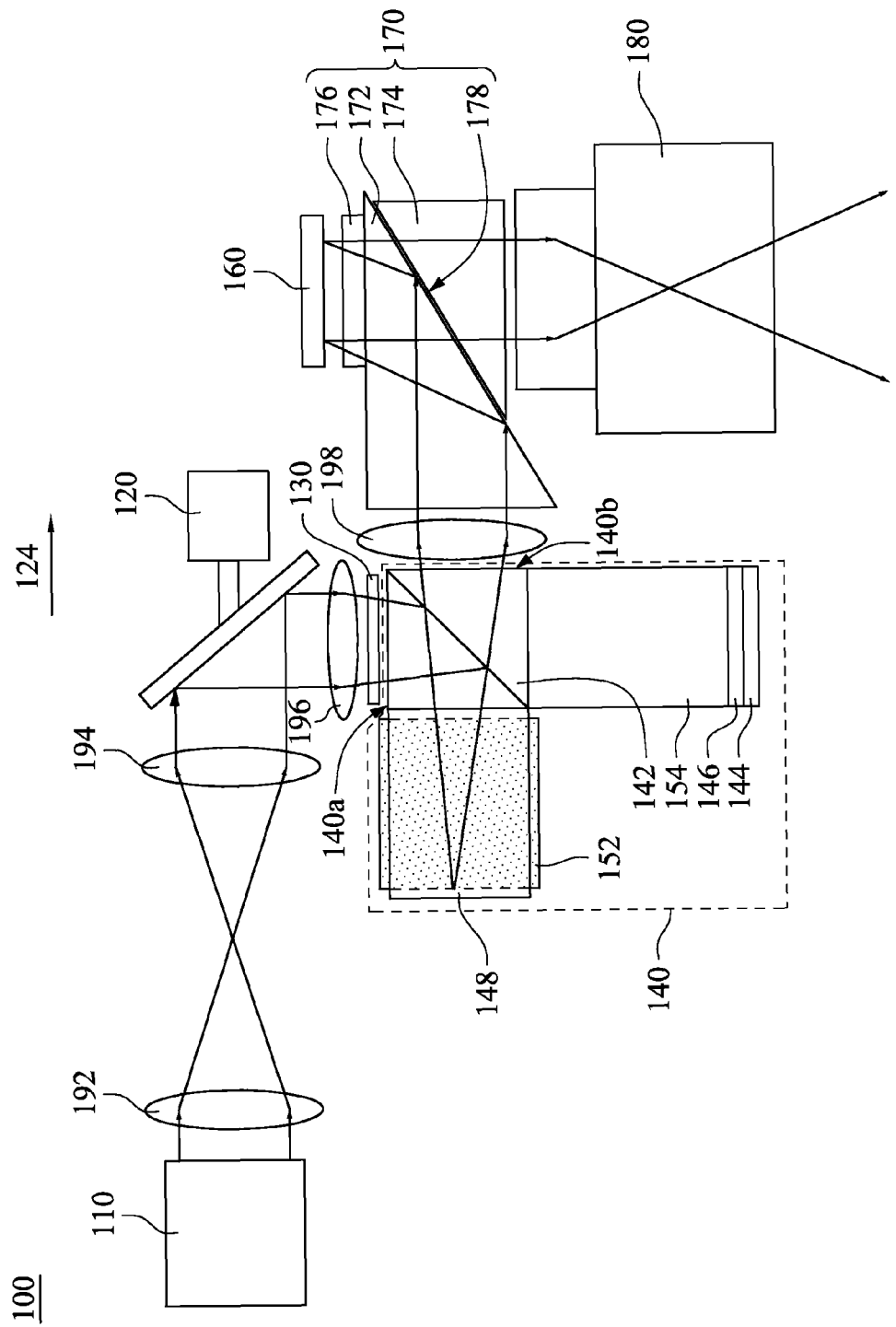
FIG. 5 is an optical schematic diagram of the projection device of FIG. 1 in the second time period.

Reference is made to FIG. 5 which is an optical schematic diagram of the projection device 100 of FIG. 1 in the second time period. Since the illustration method of FIG. 5 is the same as that of FIG. 3, and, therefore, a description in this regard will not be repeated hereinafter. In the second time period, the light source 110 emits the light beam with p-polarized state. The light beam passes through the lenses 192 and 194 and impinges on the galvano-mirror 120. The galvano-mirror 120 rotates along an axis 124 which is opposite to the axis 122 (see FIG. 3), such that the light beam is reflected to different directions by the galvano-mirror 120 in sequence. The light beam then passes through the lens 196 and the polarizing selector 130, and maintains the p-polarized state.

Figure 6:
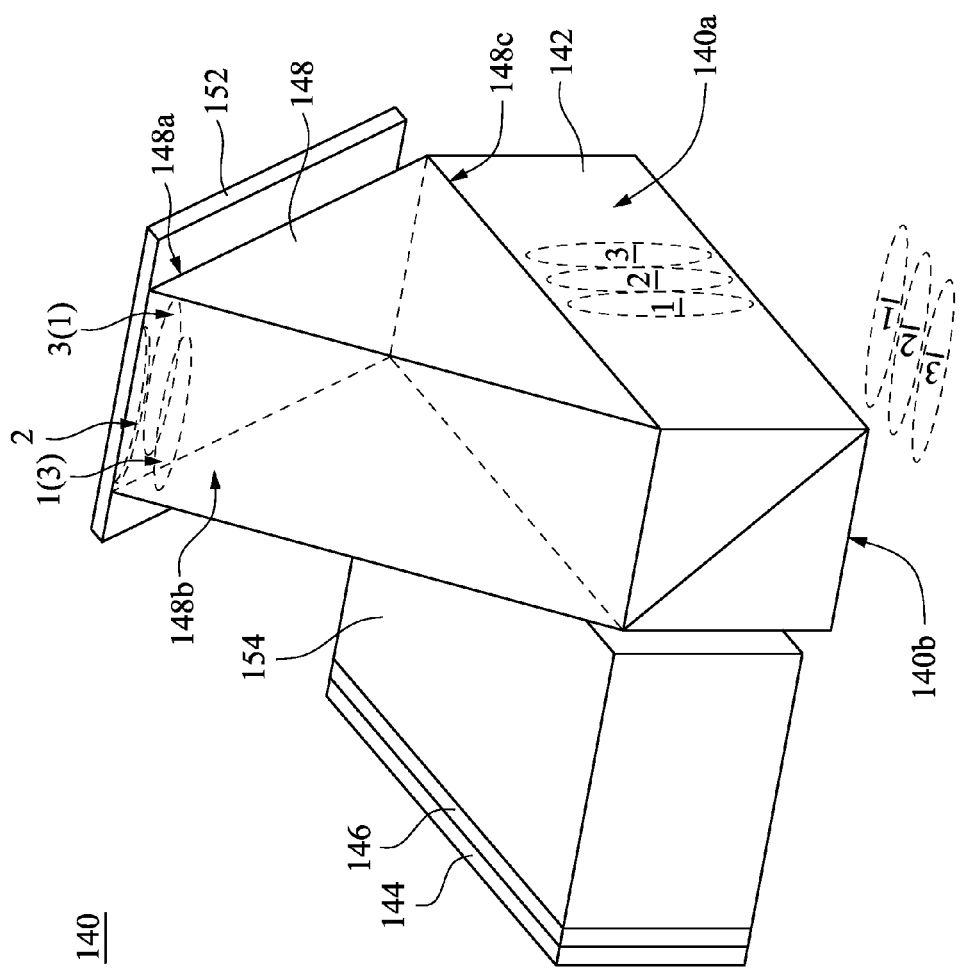
FIG. 6 is an optical schematic diagram of the optical module of FIG. 1 in the second time period.

FIG. 6 is an optical schematic diagram of the optical module 140 of FIG. 1 in the second time period. Reference is made to FIGS. 5 and 6. In the second time period, the light beams with p-polarized state impinge on the entrance 140a in sequence. The light beam shifts along an in-plane direction, which corresponds to the negative direction of FIG. 2. The light beams with p-polarized state enter the polarization beam splitter 142 from the entrance 140a and is reflected to the right-angled triangular prism 148 by the polarization beam splitter 142. The light beams enter the right-angled triangular prism 148 from the hypotenuse surface 148c, where in a first sub-time period, the light beam with the optical axis 1 reaches the hypotenuse surface 148c, and is reflected to the leg surface 148a by the leg surface 148b. Subsequently, the light beam with the optical axis 1 impinges on the second wavelength retarder 152, and is reflected to the hypotenuse surface 148c by the leg surface 148a, such that the polarization state of the light beam is converted into s-polarized state. The light beam then propagates back to the polarization beam splitter 142, passes through the polarization beam splitter 142, and leaves the optical module 140 from the exit 140b.

In a second sub-time period, a portion of the light beam with the optical axis 2 reaches the leg surface 148b, and is reflected to the leg surface 148a by the leg surface 148b. Subsequently, the portion of the light beam with the optical axis 2 impinges on the second wavelength retarder 152, and is reflected to the hypotenuse surface 148c by the leg surface 148a, such that the polarization state of the portion of the light beam is converted into s-polarized state, and the portion of the light beam then propagates back to the polarization beam splitter 142. Moreover, another portion of the light beam with the optical axis 2 reaches the leg surface 148a, impinges on the second wavelength retarder 152, and is reflected to the leg surface 148b by the leg surface 148a. Therefore, the polarization state of the portion of the light beam is converted into s-polarized state. The portion of the light beam then is reflected to the hypotenuse surface 148c by the leg surface 148b and propagates back to the polarization beam splitter 142. The light beam with the optical axis 2 then passes through the polarization beam splitter 142 and leaves the optical module 140 from the exit 140b.

In the third sub-time period, the light beam with the optical axis 3 reaches the leg surface 148a, impinges on the second wavelength retarder 152, and is reflected to the leg surface 148b by the leg surface 148a. Therefore, the polarization state of the light beam with the optical axis 3 is converted into s-polarized state. The light beam with the optical axis 3 then is reflected to the hypotenuse surface 148c by the leg surface 148b and propagates back to the polarization beam splitter 142. The light beam with the optical axis 3 then passes through the polarization beam splitter 142 and leaves the optical module 140 from the exit 140b. The light beam emerging from the exit 140b shifts toward the out-of-plane direction (corresponds to the positive direction of FIG. 2) with time.

Reference is made again to FIG. 5. The light beam leaving the optical module 140 then passes through the lens 198, enters the prism 172, and is incident the totally internal reflection interface 178 at an angle greater than the totally internal reflection angle. Hence, the light beam is reflected to the prism 176 by the totally internal reflection interface 178 and reaches the light modulator 160. The light modulator 160 modulates the light beam into a plurality of images in sequence, where the light beams with the optical axes 1, 2, and 3 of FIG. 6 are modulated into different images. The light beams with the optical axes 1 in FIGS. 4 and 6 are modulated into the same image, and so are the light beams with the optical axes 2 and 3, respectively. In other words, the images modulated by the light modulator 160 during the first time period are the same as the images modulated by the light modulator 160 during the second time period. Also, periods of the images during the first time period are the same as periods of the images during the second time period. These images are reflected back to the prism group 170 in sequence, pass through the prisms 176 and 172, and are incident the totally internal reflection interface 178 at an angle smaller than the totally internal reflection angle. Hence, the images pass through the totally internal reflection interface 178, pass through the prism 174, and impinge on the lens 180. Therefore, the projection device 100 can generate multi-view images with the same frame rate as long as switching the first time period and the second time period in sequence. The lengths of the first time period and the second time period can be both (1/60) seconds (under the usage of the galvano-mirror 120 with (1/30) seconds rotation rate). That is, the projection device 100 can generate 60 Hz multi-view images, and the claimed scope is not limited in this respect.

In summary, even though the rotational direction of the galvano-mirror 120 in the first time period is opposite to that of the galvano-mirror 120 in the second time period, the shift directions of the light beam on the exit 140b of the optical module 140 in the first and the second time periods are the same after the light beam passes through the polarized selector 130 and the optical module 140, which the polarization beam splitter 142 thereof guides the light beam that entering the entrance 140a to different optical paths, i.e., the optical path toward to the prism 154 and the optical path toward to the right-angled triangular prism 148, according to the polarization state of the light beam. Hence, the projection device 100 can generate images with the greatest frame rates that are the same as that of the middle view.

Reference is made to FIG. 7 which is a side view of the right-angled triangular prism 148, the second wavelength retarder 152, and reflective layers 156a, 156b according to another embodiment of the present invention. The difference between the present embodiment and the embodiment of FIG. 1 pertains to the present of the reflective layers 156a and 156b. In this embodiment, the optical module 140 can further include two reflective layers 156a and 156b respectively disposed on the leg surfaces 148a and 148b of the right-angled triangular prism 148. The reflective layers 156a and 156b can be formed on the leg surfaces 148a and 148b with coating process. If the light beam is incident the leg surfaces 148a and 148b at an angle smaller than the totally internal reflection angle of the leg surfaces 148a and 148b, the light beam passes through the leg surfaces 148a and 148b and leaves the right-angled triangular prism 148. The reflective layers 156a and 156b, however, can reflect the light beam back to the right-angled triangular prism 148. Moreover, if the light beam is incident the leg surfaces 148a and 148b at an angle greater than the totally internal reflection angle of the leg surfaces 148a and 148b, the structure of FIG. 1 can reflect the light beam. Other relevant structural details of the present embodiment are all the same as the embodiment of FIG. 1, and, therefore, a description in this regard will not be repeated hereinafter.

Reference is made to FIG. 8 which is a side view of an optical module 140 according to another embodiment of the present invention. The difference between the present embodiment and the embodiment of FIG. 1 pertains to the relative positions of the elements of the optical module 140. In this embodiment, the reflector 144 is disposed at one side of the polarization beam splitter 142 opposite to the exit 140b, and the right-angled triangular prism 148 is disposed at one side of the polarization beam splitter 142 opposite to the entrance 140a. Therefore, the light beam propagates to the right-angled triangular prism 148 in the first time period while propagates to the reflector 144 in the second time period. Other relevant structural details of the present embodiment are all the same as the embodiment of FIG. 1, and, therefore, a description in this regard will not be repeated hereinafter.

Figure 9:
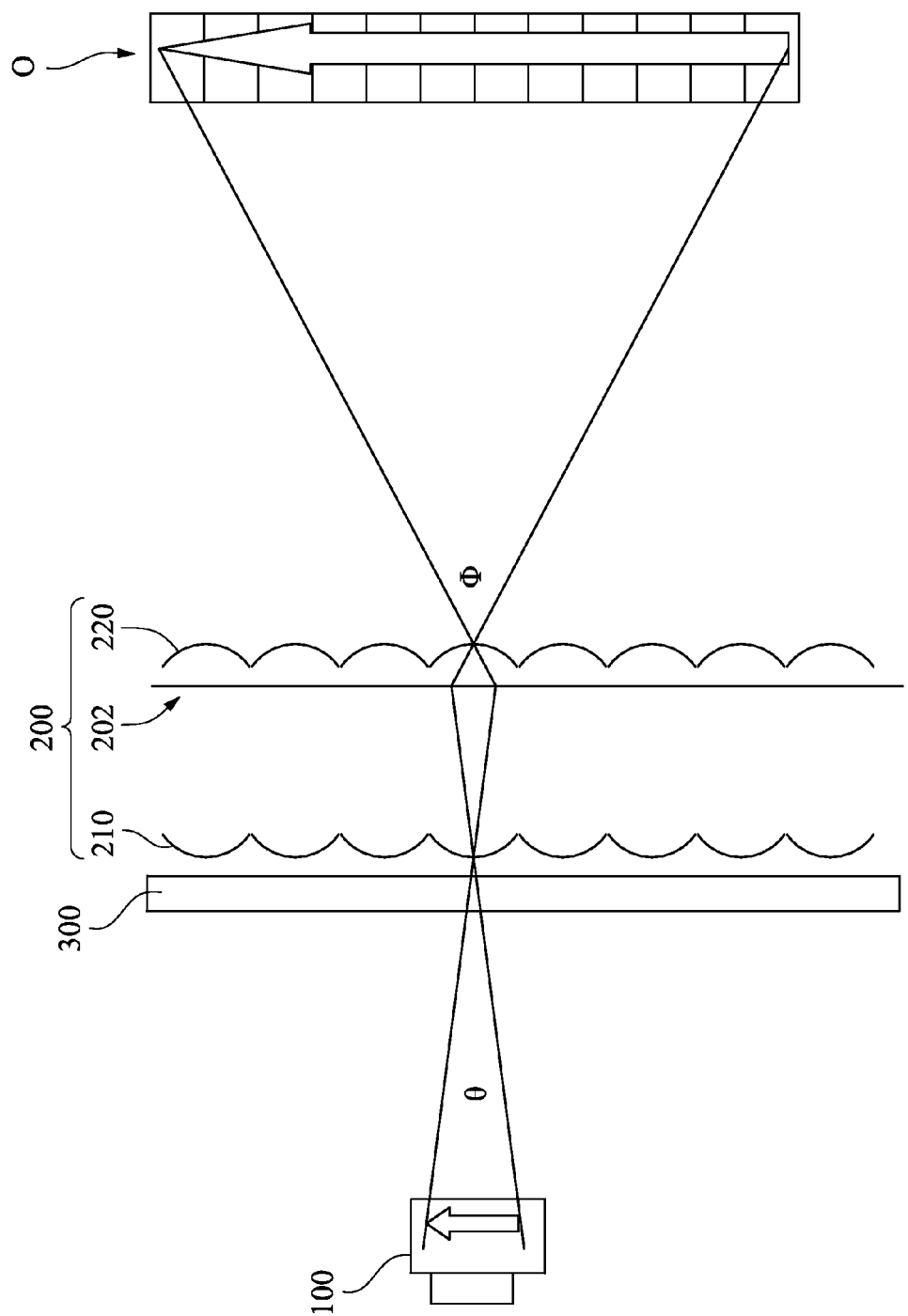
FIG. 9 is a schematic diagram of an autostereoscopic display device including the projection device of FIG. 1.

Reference is made to FIG. 9 which is a schematic diagram of an autostereoscopic display device including the projection device 100 of FIG. 1. The autostereoscopic display device includes the projection device 100, a screen 200, and a collimating lens 300. The collimating lens 300 is disposed between the projection device 100 and the screen 200. The screen 200 includes a first lens array 210 and a second lens array 220. An image plane 202 is formed between the first lens array 210 and the second lens array 220. The collimating lens 300 converts a point light source, i.e., the projection device 100, into a plane light source. A projection angle θ is formed between the images generated by the projection device 100. The images pass though the collimating lens 300, become a plane light source, and impinge on the screen 200. The first lens array 210 of the screen 200 guides the images to the image plane 202, and the images pass through the second lens array 220 and impinge on an observing plane O. The second lens array 200 changes the projection angle θ to a projection angle φ which is greater than the projection angle θ. Accordingly, the observing angle at the observing plane O can be enlarged.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A projection device, comprising:
   a light source for providing a light beam;
   a galvano-mirror configured to deflect the light beam to different directions in sequence;
   a polarizing selector configured to selectively convert the polarization state of the light beam;
   an optical module having an entrance and an exit, wherein the light beam passing through the polarizing selector enters the optical module from the entrance, and the optical module guides the light beam to the exit, the optical module comprises:
      a polarization beam splitter having the entrance and the exit, wherein the polarization beam splitter guides the light beam that entering the entrance to different optical paths according to the polarization state of the light beam;
      a reflector;
      a first wavelength retarder disposed between the polarization beam splitter and the reflector;
      a right-angled triangular prism having a hypotenuse surface and two leg surfaces opposite to each other, wherein the hypotenuse surface of the right-angled triangular prism is disposed facing the polarization beam splitter; and
      a second wavelength retarder disposed on one of the leg surfaces of the right-angled triangular prism;
   a light modulator configured to modulate the light beam passing through the exit of the optical module into a plurality of images in sequence;
   a lens; and a prism group configured to guide the light beam passing through the exit of the optical module to the light modulator, and guide the images to the lens.

2. The projection device of claim 1, wherein the reflector is disposed at one side of the polarization beam splitter opposite to the entrance, and the right-angled triangular prism is disposed at one side of the polarization beam splitter opposite to the exit.

3. The projection device of claim 1, wherein the reflector is disposed at one side of the polarization beam splitter opposite to the exit, and the right-angled triangular prism is disposed at one side of the polarization beam splitter opposite to the entrance.

4. The projection device of claim 1, wherein the leg surfaces of the right-angled triangular prism are both totally internal reflection surfaces.

5. The projection device of claim 1, wherein the optical module further comprises two reflective layers respectively disposed on the leg surfaces of the right-angled triangular prism.

6. The projection device of claim 1, wherein the polarization beam splitter is a polarization beam splitting prism.

7. The projection device of claim 1, wherein the optical module further comprises:

a prism disposed between the polarization beam splitter and the first wavelength retarder.

8. The projection device of claim 1, wherein the polarizing selector is a liquid crystal panel; when the liquid crystal panel is in on-state, the liquid crystal panel allows to convert the polarization state of the light beam; and when the liquid crystal panel is in off-state, the light beam maintains the polarization state when passing through the liquid crystal panel.

9. The projection device of claim 1, wherein a rotational direction of the galvano-mirror in a first time period is opposite to a rotational direction of the galvano-mirror in a second time period.

10. The projection device of claim 9, wherein periods of the images modulated by the light modulator during the first time period are the same as periods of the images modulated by the light modulator during the second time period.

* * * * *